United States Patent [19]

Assaad et al.

[11] Patent Number: 5,385,190
[45] Date of Patent: Jan. 31, 1995

[54] BIASED PNEUMATIC TIRE HAVING A BELT STRUCTURE WITH SIX ANNULAR LAYERS

[75] Inventors: Mahmoud C. Assaad, Uniontown; David C. Wagner, Akron, both of Ohio

[73] Assignee: The Goodyear Tire & Rubber Company, Akron, Ohio

[21] Appl. No.: 49,236

[22] Filed: Apr. 16, 1993

Related U.S. Application Data

[63] Continuation of Ser. No. 790,886, Nov. 12, 1991, abandoned.

[51] Int. Cl.$^6$ .................. B60C 11/04; B60C 9/06; B60C 9/18
[52] U.S. Cl. .................. 152/209 R; 152/526; 152/559
[58] Field of Search .................. 152/209 R, 450, 526, 152/527, 538, 539, 548, 553, 556, 559

[56] References Cited

U.S. PATENT DOCUMENTS

| | | | |
|---|---|---|---|
| 1,165,631 | 12/1915 | Seward, Jr. | 152/548 |
| 2,943,663 | 7/1960 | Antonson . | |
| 2,982,328 | 5/1961 | Emanueli et al. . | |
| 3,002,546 | 10/1961 | Limmer . | |
| 3,126,042 | 10/1960 | Cegnar . | |
| 3,205,931 | 9/1965 | Keefe, Jr. | 152/538 |
| 3,233,649 | 10/1966 | Jolivet et al. . | |
| 3,473,594 | 10/1969 | Mirtain . | |
| 3,543,827 | 12/1970 | Roberts et al. | 152/209 R |
| 3,620,279 | 11/1971 | Bartha et al. | 152/538 |
| 3,685,564 | 8/1972 | Smithkey, Jr. | 152/538 |
| 3,687,757 | 8/1972 | Menell . | |
| 3,754,588 | 8/1973 | Rach et al. . | |
| 3,786,851 | 1/1974 | Mirtain et al. . | |
| 3,830,276 | 8/1974 | Smithkey, Jr. . | |
| 3,831,656 | 8/1974 | Senger et al. . | |
| 3,881,538 | 5/1975 | Mirtain . | |
| 3,901,751 | 8/1975 | Wilson . | |
| 3,921,692 | 11/1975 | Oyoun . | |
| 3,973,613 | 8/1976 | Marzocchi et al. . | |
| 4,050,497 | 9/1977 | Pakur et al. . | |
| 4,157,933 | 6/1979 | Goodfellow . | |
| 4,184,529 | 1/1980 | Boileau . | |
| 4,218,277 | 8/1980 | Van Der Burg . | |
| 4,240,488 | 12/1980 | Wilcox . | |
| 4,280,547 | 7/1981 | Gilmore . | |
| 4,342,351 | 8/1982 | Kuroda | 152/526 |
| 4,523,619 | 6/1985 | Gouttebessis . | |
| 4,602,666 | 7/1086 | Kabe et al. . | |
| 4,924,927 | 5/1990 | Kawabata et al. . | |
| 4,935,428 | 6/1990 | Aoki et al. . | |
| 4,966,214 | 10/1990 | Kadota . | |
| 4,987,938 | 1/1991 | Ushikubo et al. . | |
| 5,027,877 | 7/1991 | Tamura et al. | 152/527 |

FOREIGN PATENT DOCUMENTS

| | | | |
|---|---|---|---|
| 0448901 | 10/1991 | European Pat. Off. . | |
| 0028004 | 1/1990 | Japan | 152/526 |
| 0815139 | 6/1959 | United Kingdom | 152/553 |
| 0973944 | 11/1964 | United Kingdom | 152/538 |
| 2087806 | 6/1982 | United Kingdom | 152/548 |

OTHER PUBLICATIONS

Database WPIL, No. 90-250 974 Derwent Publications, Ltd., London, Gb, Abstract & JP-A-2-175-301.

Primary Examiner—Michael W. Ball
Assistant Examiner—Nancy T. Krawczyk
Attorney, Agent, or Firm—Bruce J. Hendricks

[57] ABSTRACT

The present invention relates to a bias pneumatic tire having a belt structure comprising six annular layers. The tire of the present invention has particular utility as an aircraft tire and avoids many of the undesirable stresses/strains resulting from the deformation in the tread areas of the tire.

4 Claims, 1 Drawing Sheet

BIASED PNEUMATIC TIRE HAVING A BELT STRUCTURE WITH SIX ANNULAR LAYERS

This is a continuation of copending application Ser. No. 07/790,886, filed on Nov. 12, 1991, now abandoned.

BACKGROUND OF THE INVENTION

The demands placed upon aircraft tires are extreme compared to those experienced by passenger car tires. The severe deformation of the tread upon landing, take offs, and taxing causes significant stresses/strains across the tire profile and eventually result in tire failure. Prior to total failure, the aircraft tire commonly loses chucks of tread at the point of greatest deflection or ply separation in the shoulder area of the tire. Unfortunately, these demands continue and the problems they cause still exist.

SUMMARY OF THE INVENTION

The present invention relates to a biased pneumatic tire which comprises a belt structure having six annular layers of parallel cords underlining the tread, unanchored to a bead and having both right and left cord angles in the range from 10° to 30° with respect to the equatorial plane of the tire.

BRIEF DESCRIPTION OF THE DRAWING

The invention will be described by way of example with respect to the accompanying drawing in which.

DESCRIPTION OF THE PREFERRED EMBODIMENT

Figure 1:
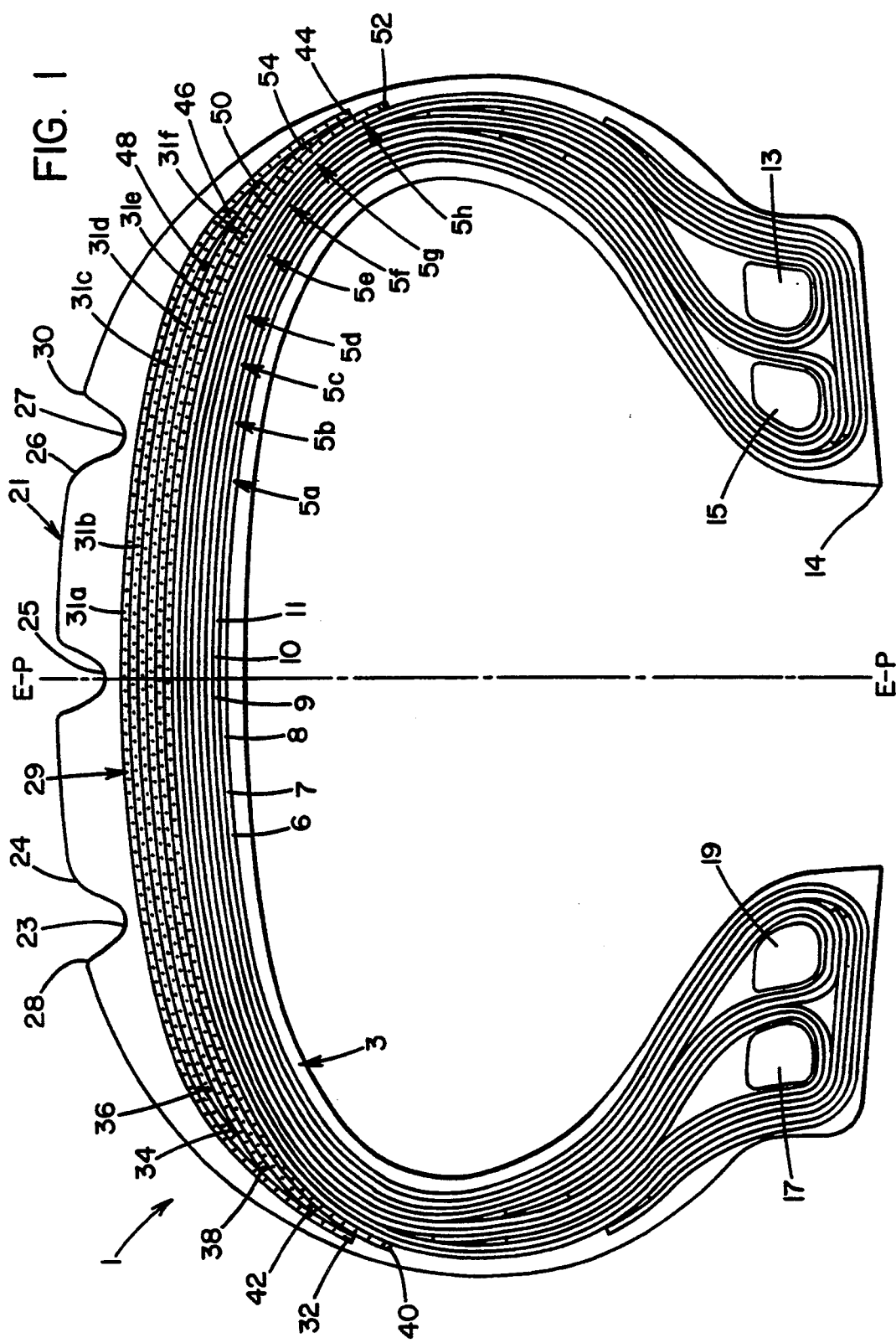
FIG. 1 is a cross sectional view of a tire according to an aspect of the present invention.

A presently preferred embodiment of this invention is shown in FIG. 1. The biased pneumatic tire 1 has a toroidal carcass 3 having a plurality of plies 5a, 5b, 5c, 5d, 5e, 5f, 5g, 5h, each containing reinforcing cords 6, 7, 8, 9, 10, 11, which extend diagonally across the tire 1 at about 20° to 50° angle with respect to the equatorial plane E-P of the tire 1. Preferably the reinforcing cords in each carcass ply extend diagonally across the tire 1 from bead 13, 15 to bead 17, 19 at about a 26° to 33° angle with respect to the equatorial plane, E-P of the tire 1. The number of plies in the carcass may vary with from about 4 to 12 being preferred and 8 plies being particularly preferred. As shown in FIG. 1, two turnup plies 5c and 5d, turn around a single bead 15 from inside of the tire 1 toward the outside thereof. Two turn-up plies 5e and 5f turn around the other single bead 13 from inside of the tire 1 toward the outside thereof. Two plies, 5a, 5b, turn around both beads 13, 15 from inside of the tire 1 toward the outside thereof. The other two plies 5g, 5h turn around the outer bead 13, and ends in the area of the toe 14 of the tire 1. The reinforcing cords 6, 7, 8, of each ply structure 5a are parallel to each other. The cords 6, 7, 8 versus 9, 10, 11 run at opposite angles in alternating layers.

The tire 1 has a plurality of beads 13, 15, 17, 19. Bead is used herein to mean that part of the tire 1 comprising an annular tensile member wrapped by ply cords and shaped with or without other reinforcement elements such as flippers, chippers, apexes, toe guards and chafers, to fit the design rim. The embodiment illustrated in FIG. 1 is known as a dual beaded tire and has four beads 13, 15, 17, 19 whereas the present invention may include the use of 2, 4, 6, or up to 8 beads in total.

The tire of the present invention has a tread 21 being integral with the carcass 3. The term tread means a molded rubber component which, when bonded to a tire carcass 3, includes that portion of the tire 1 that comes into contact with the ground when the tire 1 is normally inflated and under normal load. The tire 1 shown in FIG. 1 comprises three grooves 23, 25, 27 or elongated void areas that extend circumferentially about the tread 21 in a straight manner. The tread 21 may include any number of grooves or grooves of various profiles depending on the desired use of the tire. The tread 21 shown in FIG. 1 is particularly suited for aircraft applications. The outer two grooves 23, 27 are asymmetric with the inside edge 24, 26 of each groove 23, 27 having a larger radius of curvature compared to the outer edge 28, 30 of each groove 23, 27.

An essential aspect of the present invention is the belt structure 29 having six annular layers 31a, 31b, 31c, 31d, 31e, 31f, of parallel cords underlying the tread 21, unanchored to a bead 13, 15, 17, 19 and having both left and right cord angles in the range from 10° to 30° with respect to the equatorial plane E-P of the tire 1. Preferably, the cord angles range from about 21° to 26° with respect to the equatorial plane E-P of the tire 1. The parallel cords run at opposite angles in alternating layers. The belt structure 29 is located above the plurality of plies 5a, 5b, 5c, 5d, 5e, 5f, 5g, 5h in the toroidal carcass 3 and below the tread 21.

The cord used in the belt structure 29 may be rayon, nylon, polyester, glass fiber, steel wire, or the like. Preferably, the cord is nylon. Conventional diameters and cords may be used in conjunction with the present invention.

The terminal ends 32, 34, 36, 38, 40, 42, 44, 46, 48, 50, 52, 54, of each annular layer are staggered relative to the remaining five layers. The terminal end 32 of the uppermost annular layer 31a closest to the tread 21 overlaps the terminal ends 34, 36, 38, 42, of the remaining four underlying annular layers 31b, 31c, 31d, 31e. Likewise, the other terminal end 44 of the uppermost layer 31a closest to the tread 21 overlaps the terminal ends 46, 48, 50, 54, of the underlying four annular layers 31b, 31c, 31d, 31e.

EXAMPLE

There was provided a test tire for an airplane with a tire size of 25.5×8.0-14 as shown in FIG. 1. The two uppermost layers and two lowermost layers of the six annular layers of the belt contained cords of nylon 6.6 (1260/2). The two middle layers of the six annular layers contained cords made of nylon 6,6 (840/2). The angle of the cord in the upper two of six annular layers was 22°. The angle of the cord in the middle two of six annular layers was 23°. The angle of the cord in the lower most two of six annular layers was 24°. Each alternating layer of cord was at opposite angles.

A series of tests were conducted to simulate actual aircraft conditions including taxi-takeoffs, landing-taxis, extended taxis and taxis-rejected takeoffs. The inflation pressure of the tire was 310 psi, the simulated load on the tire was 16,200 lbs. with a maximum speed of 250 mph. The tire accomplished the following without failure:

15–250 mph taxis-takeoffs
32–230 mph taxis-takeoffs
47–180 mph landings
2–30,000 ft. taxi
1-taxi rejected takeoff It will be understood that the foregoing disclosure of preferred embodiments of the present invention is for the purpose of illustration only, and that the various structural operational features disclosed may be modified and changed in a number of ways none of which involves any departure from the scope and spirit of the present invention as claimed herein.

What is claimed is:

1. A pneumatic bias aircraft tire comprising (a) a toroidal carcass having a plurality of plies each containing reinforcing cords which extend diagonally across the tire at about a 26° to 33° angle with respect to the equatorial plane of the tire, (b) a plurality of beads ranging from 4 to 8 which are each wrapped by at least one reinforcing cord, (c) a tread being integral with the carcass and wherein the number of grooves consist of three and the outer two grooves are asymmetric with the inside edge of each groove having a layer radius of curvature compared to the outside edge of said grooves, (d) a belt structure located above the plurality of plies in the toroidal carcass and below said tread, said belt structure having six annular layers of parallel cord underlying the tread, unanchored to the bead, and having both left and right cord angles in a range from 21° to 26° with respect to the equatorial plane of the tire and wherein the terminal end of each annular layer is staggered relative to the terminal ends of the remaining five annular layers and the terminal ends of the uppermost annular layer closest to the tread only overlap the terminal ends of the next four underlying annular layers.

2. The pneumatic tire of claim 1 wherein the carcass has eight plies.

3. The pneumatic tire of claim 1 wherein the tire has a total of four beads.

4. The pneumatic tire of claim 1 wherein the cords in the belt structure are nylon.

* * * * *